June 16, 1925.
I. B. TANNER
LIQUID TREATING APPARATUS
Filed May 4, 1923
1,542,187
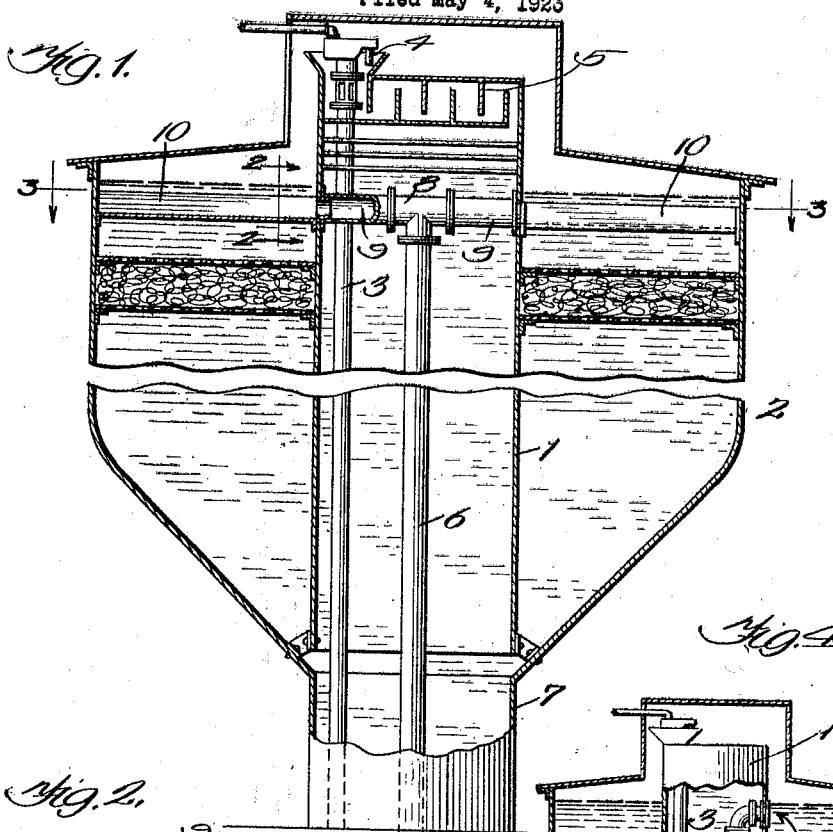
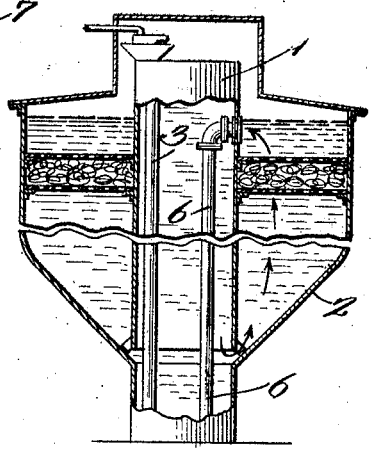
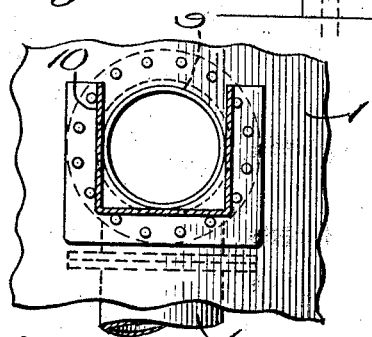
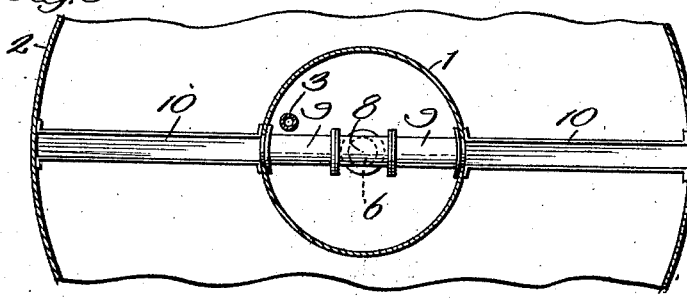
Inventor:
Inos B. Tanner Patented June 16, 1925.

1,542,187

UNITED STATES PATENT OFFICE.

INOS B. TANNER, OF CHICAGO, ILLINOIS, ASSIGNOR TO JOSEPH E. NELSON & SONS, OF CHICAGO, ILLINOIS, A COPARTNERSHIP COMPOSED OF JOHN E. NELSON AND WILLIAM H. NELSON.

LIQUID-TREATING APPARATUS.

Application filed May 4, 1923. Serial No. 636,745.

*To all whom it may concern:*

Be it known that I, INOS B. TANNER, citizen of the United States, residing at Chicago, in the county of Cook and State of Illinois, have invented a certain new and useful Improvement in Liquid-Treating Apparatus, of which the following is a full, clear, concise, and exact description.

My invention relates to liquid treating apparatus employing a reaction chamber in which the liquid to be treated and the chemical for treating the liquid are initially received, a settling tank extending above the bottom of the reaction chamber and with which the lower part of the reaction chamber is in communication, and an outlet opening for the treated liquid at the upper portion of the settling tank.

The time occupied by the liquid in flowing downwardly in the reaction chamber and upwardly from the bottom of the reaction chamber to the outlet in the settling tank should be sufficient for the desired reaction between the liquid and chemical and the separation of the resulting precipitate from the liquid before it is discharged as fully treated from the settling tank. In apparatus as hitherto constructed the liquid would seek a direct or short circuited and speedy path from the bottom of the reaction chamber to the liquid outlet in the settling tank with the result that the liquid would frequently not be completely treated before its discharge.

I overcome or mitigate the objection noted by placing a trough in the path followed by the liquid to its outlet. The trough causes the path to widen or diverge from the bottom of the reaction chamber, thereby preventing short circuited outflow of the liquid, whereby opportunity is afforded for the completion of the treating process.

My invention is of particular service in connection with water softening apparatus. It will be more fully explained by reference to the accompanying drawing illustrating its application to such apparatus, Fig. 1 being a vertical sectional view; Fig. 2 a sectional view on line 2—2 of Fig. 1; Fig. 3 a sectional view on line 3—3 of Fig. 1; and Fig. 4 a diagrammatic view illustrating the defect in apparatus of the prior art.

Like parts are indicated by similar characters of reference throughout the different figures.

The reaction chamber 1 is surrounded by the settling tank 2 that is spaced apart therefrom laterally of the reaction chamber and at the lower end of this chamber. The raw water is admitted to the upper portion of the reaction chamber from the raw water pipe 3. Water softening chemical also enters the upper portion of the reaction chamber, being admitted thereto from the chemical discharge pipe 4. Any suitable mechanism is employed for maintaining proper proportions between the raw water and the water softening chemical, and as such are well known to those skilled in the art detailed description and illustration thereof will not be necessary.

The chemical and water become thoroughly intermixed in their downward progress, it sometimes being desirable to interpose mixing devices, such as the baffle plates 5, in the path of flowing chemical and water. The water flows from the bottom of the reaction chamber through the annular space between this chamber bottom and the surrounding settling tank. The water rises to seek the softened water outlet pipe 6 when it is open for the flow of softened water therethrough. The time occupied by the water in flowing downwardly through the reaction chamber and upwardly through the settling tank should be sufficient to permit of the desired chemical reaction and the settling of the resulting percipitate into the sludge box 7. Hitherto the outgoing water would take a short circuited path such as that indicated by the arrows in Fig. 4 whereby the water would be discharged before there was opportunity afforded for the completion of the process.

In carrying out my invention I interpose a trough in the path of the water flowing to the outlet piping and which serves to convey outgoing treated liquid thereto. The outlet pipe 6 terminates in a T 8, there then being two softened water outlets in the embodiment of the invention shown, one at each end of the head of the T. For the sake of convenience and to insure an even outflow from various parts of the tank, the pipe 6 and T 8 are centrally disposed within the reaction chamber, and the head of the T has continuations 9, 9 that communicate with the settling tank space upon the exterior of the chamber through diametrically opposite openings in the wall of the reaction chamber. A horizontal trough 10 extending crosswise of the tank is provided on each side of the reaction chamber and bridges the space between the tank and reaction chamber. These troughs are diametrically arranged and the spaces thereof are in register with the softened water outlet openings at the outer ends of the pipes 9, each trough being individual to an opening. Filters 11 may be located a little below the troughs.

From the arrangement set forth, it is quite apparent that the outgoing softened water will find paths which diverge or flare upwardly, instead of paths which are thin and quickly followed as illustrated in Fig. 4, whereby sufficient opportunity is given for the completion of the water softening process before the water is withdrawn for use.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. Liquid treating apparatus including a reaction chamber; means for supplying liquid to be treated and liquid treating chemical to said chamber; a settling tank in communication with the reaction chamber at the lower part of said chamber and extending above said lower part of said chamber and having an outlet opening at an upper portion; and a trough in and extending crosswise of the settling tank in register with said outlet opening for conveying treated liquid thereto.

2. Liquid treating apparatus including a reaction chamber; means for supplying liquid to be treated and liquid treating chemical to said chamber; a settling tank surrounding the reaction chamber and in communication therewith at the lower part thereof and having an outlet opening at an upper portion; and a trough in and extending crosswise of the settling tank in register with said outlet opening for conveying treated liquid thereto.

3. Liquid treating apparatus including a reaction chamber; means for supplying liquid to be treated and liquid treating chemical to said chamber; a settling tank surrounding the reaction chamber and communicating therewith at the lower part thereof and having two separated outlet openings in the wall of the reaction chamber; discharge piping in communication with said outlet openings and located within the reaction chamber; and two oppositely located troughs between the receiving chamber and the surrounding wall of the settling tank, each trough being individual to an outlet opening that is in register therewith for conveying treated liquid thereto.

In witness whereof I hereunto subscribe my name this 30th day of April A. D., 1923.

INOS B. TANNER.